(12) United States Patent
Abrol et al.

(10) Patent No.: US 7,096,261 B2
(45) Date of Patent: Aug. 22, 2006

(54) METHOD AND APPARATUS FOR PROVIDING MULTIPLE QUALITY OF SERVICE LEVELS IN A WIRELESS PACKET DATA SERVICES CONNECTION

(75) Inventors: Nischal Abrol, San Diego, CA (US); Marcello Lioy, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 1034 days.

(21) Appl. No.: 09/823,475

(22) Filed: Mar. 30, 2001

(65) Prior Publication Data

US 2002/0141370 A1 Oct. 3, 2002

Related U.S. Application Data

(60) Provisional application No. 60/275,242, filed on Mar. 12, 2001.

(51) Int. Cl.
*G06F 15/173* (2006.01)
*H04L 12/56* (2006.01)

(52) U.S. Cl. .................... 709/223; 709/225; 370/392
(58) Field of Classification Search .............. 370/328, 370/349, 392, 466, 474, 338; 709/223, 225
See application file for complete search history.

(56) References Cited

U.S. PATENT DOCUMENTS

| | | | |
|---|---|---|---|
| 6,542,490 B1 * | 4/2003 | Ahmadvand et al. | 370/338 |
| 6,697,352 B1 * | 2/2004 | Ludwig et al. | 370/349 |
| 6,795,705 B1 * | 9/2004 | Warrier et al. | 455/435.1 |

FOREIGN PATENT DOCUMENTS

| | | |
|---|---|---|
| EP | 0975123 | 1/2000 |
| EP | 1049298 | 11/2000 |
| WO | 9531060 | 11/1995 |

* cited by examiner

*Primary Examiner*—Zarni Maung
*Assistant Examiner*—Karen Tang
(74) *Attorney, Agent, or Firm*—Philip Wadsworth; Sandra L. Godsey; Byron Yafuso

(57) ABSTRACT

The packets generated by each of multiple packet data applications are provided to a single Point-to-Point Protocol (PPP) stack and a single High-level Data Link Control (HDLC) framing layer to convert data packets into byte streams suitable for transmission through Radio Link Protocol (RLP) connections. Each of the resultant multiple byte streams is then provided to one of multiple RLP connections having different retransmission and delay properties. The RLP connection selected for sending data from each application is based on the grade of service most appropriate for the application. At the receiver, the data from the multiple RLP connections is provided to a single PPP stack.

26 Claims, 6 Drawing Sheets

METHOD AND APPARATUS FOR PROVIDING MULTIPLE QUALITY OF SERVICE LEVELS IN A WIRELESS PACKET DATA SERVICES CONNECTION

CROSS REFERENCE OF APPLICATION

This application claims priority from co-pending Provisional Application No. 60/275,242, file Mar. 12, 2001, entitled "Method and Apparatus for Providing Multiple Quality of Service Levels in a Wireless Packet Data Services Connection."

BACKGROUND

1. Field

The present invention relates to wireless communications. More particularly, the present invention relates to a novel method and apparatus for providing multiple levels of quality of service in a wireless packet data network between a mobile station and a wireless network.

2. Background

The use of code division multiple access (CDMA) modulation techniques is one of several techniques for facilitating communications in which a large number of system users are present. Other multiple access communication system techniques, such as time division multiple access (TDMA), frequency division multiple access (FDMA) and AM modulation schemes such as amplitude companded single sideband (ACSSB) are known in the art. These techniques have been standardized to facilitate interoperation between equipment manufactured by different companies. Code division multiple access communication systems have been standardized in the United States in Telecommunications Industry Association TIA/EIA/IS-95-B, entitled "MOBILE STATION-BASE STATION COMPATIBILITY STANDARD FOR DUAL-MODE WIDEBAND SPREAD SPECTRUM CELLULAR SYSTEMS", and referred to herein as IS-95. In addition, a new standard for CDMA communication systems has been proposed in the United States in Telecommunications Industry Association (TIA), entitled "Upper Layer (Layer 3) Signaling Standard for cdma2000 Spread Spectrum Systems, Release A—Addendum 1", dated Oct. 27, 2000, and referred to herein as "cdma2000."

The International Telecommunications Union recently requested the submission of proposed methods for providing high rate data and high-quality speech services over wireless communication channels. A first of these proposals was issued by the Telecommunications Industry Association, entitled "The IS-2000 ITU-R RTT Candidate Submission." A second of these proposals was issued by the European Telecommunications Standards Institute (ETSI), entitled "The ETSI UMTS Terrestrial Radio Access (UTRA) ITU-R RTT Candidate Submission", also known as "wideband CDMA" and hereinafter referred to as "W-CDMA." A third proposal was submitted by U.S. TG 8/1 entitled "The UWC-136 Candidate Submission", hereinafter referred to as "EDGE." The contents of these submissions is public record and is well known in the art.

IS-95 was originally optimized for transmission of variable-rate voice frames. Subsequent standards have built on the standard to support a variety of additional non-voice services including packet data services. One such set of packet data services was standardized in the United States in Telecommunications Industry Association TIA/EIA/IS-707-A, entitled "Data Service Options for Spread Spectrum Systems", incorporated by reference herein, and hereafter referred to as "IS-707."

IS-707 describes techniques used to provide support for sending Internet Protocol (IP) packets through an IS-95 wireless network. Packets are encapsulated into a featureless byte stream using a protocol called Point-to-Point Protocol (PPP). Using PPP, IP packets can be transported over a wireless network in segments of arbitrary size. The wireless network maintains PPP state information for the duration of the PPP session, or as long additional bytes may be sent in the continuous byte stream between the PPP end points.

Such a continuous byte stream is subsequently encapsulated into a series of IS-95 frames using a protocol called Radio Link Protocol (RLP). RLP includes an error control protocol that uses negative acknowledgments (NAKs) by which the receiver prompts the sender to retransmit lost RLP frames. Because the RLP error control protocol uses retransmissions, RLP data transmission generally exhibits a variable transmission delay from sender to receiver. A modified form of RLP called Synchronous RLP (SRLP), in which no NAKs and no retransmissions are sent by sender or receiver, is well known in the art. The frame error rate in SRLP is greater than that of RLP, but the transmission delay is kept to a minimal constant.

A remote network node such as a personal or laptop computer (PC) connected to a packet-data-capable wireless mobile station (MS) may access the Internet through a wireless network in accordance with the IS-707 standard. Alternatively, the remote network node such as a web browser may be built-in to the MS, making the PC optional. An MS may be any of a number of types of devices including, but not limited to PC card, personal data assistant (PDA), external or internal modem, or wireless phone or terminal. The MS sends data through the wireless network, where it is processed by a packet data serving node (PDSN). The PPP state for a connection between an MS and the wireless network is typically maintained within the PDSN. The PDSN is connected to an IP network such as the Internet, and transports data between the wireless network and other entities and agents connected to the IP network. In this way, the MS can send and receive data to another entity on the IP network through the wireless data connection. The target entity on the IP network is also called a correspondent node. The interaction between a MS and the PDSN have been standardized in EIA/TIA/IS-835, entitled "Wireless IP Network Standard," dated June, 2000, and referred to herein as "IS-835." One skilled in the art will recognize that, in some networks, the PDSN is replaced with an Interworking Function (IWF).

In order to provide more complex wireless network services, there is an increasing desire and need to provide different types of services simultaneously through a single wireless device. Examples include simultaneous voice and packet data services. Examples also include multiple types packet data services, such as simultaneous web browsing and video conferencing. At the same time, technological advances are increasing the bandwidth available through a single wireless channel between a wireless device and the wireless network.

However, modern networks are not yet capable of supporting simultaneous packet data services having substantially different grades of service. For example, delay sensitive applications like video conferencing and voice over IP are optimally sent without RLP retransmissions in order to reduce the magnitude and variability of packet delay through the network. On the other hand, applications such as FTP, e-mail, and web browsing are less delay-sensitive, so are optimally sent using RLP retransmissions. Current wireless standards adequately support a wireless application that requires any one of several grades of service, but not multiple applications in a single MS, where the applications require different grades of service. There is therefore a need in the art for a way of supporting multiple applications in a single MS, where the multiple applications use different grades of service.

SUMMARY

Embodiments disclosed herein address the above stated needs by enabling a mobile station (MS) and a Radio Access Network (RAN) to establish a connection that supports multiple grades of services with a single IP address assigned to the MS. The embodiments described herein enable a data sender to use a single IP address for multiple packet data applications. The packets generated by each of the multiple packet data applications are provided to a single Point-to-Point Protocol (PPP) stack and a single High-level Data Link Control (HDLC) framing layer to convert data packets into byte streams suitable for transmission through Radio Link Protocol (RLP) connections. Each of the resultant multiple byte streams is then provided to one of multiple RLP connections having different retransmission and delay properties. The RLP connection selected for sending data from each application is based on the grade of service most appropriate for the application.

The receiver receives the data on the multiple RLP connections and reassembles the byte streams into frames. The receiver may utilize multiple HDLC framing layers, with one HDLC framing layer corresponding to one RLP connection. Alternatively, the receiver may utilize a single HDLC framing layer and multiple simple "deframer" layers. Each deframer layer corresponds to a single RLP connection, and searches for flag characters that delimit HDLC frames in each RLP byte stream. The deframer layer does not remove HDLC escape codes, but rather provides HDLC stream data to the single HDLC layer as a complete, contiguous HDLC frame.

The word "exemplary" is used throughout this application to mean "serving as an example, instance, or illustration." Any embodiment described as an "exemplary embodiment" is not to be construed as necessarily preferred or advantageous over other embodiments described herein.

DETAILED DESCRIPTION

[Optional Definitions Section]

Multiple applications using different grades of service could be supported on a single wireless device using a separate Point-to-Point Protocol (PPP) stack for each application. This approach has several disadvantages. Supporting multiple PPP instances for a single mobile station (MS) would needlessly consume large amounts of data memory in both the MS and the Packet Data Serving Node (PDSN).

In addition, if a Radio Link Protocol (RLP) session were established for use by an application that required low latency, the RLP should be configured to operate without retransmissions. While this would result in the low latency that is best for overlying application, the Link Control Protocol (LCP) and other configuration protocols that are required to establish the PPP link would have to proceed without error control. The resulting increase in frame error rate could cause delays or even failure of PPP configuration before any application packets could be sent.

Figure 1:
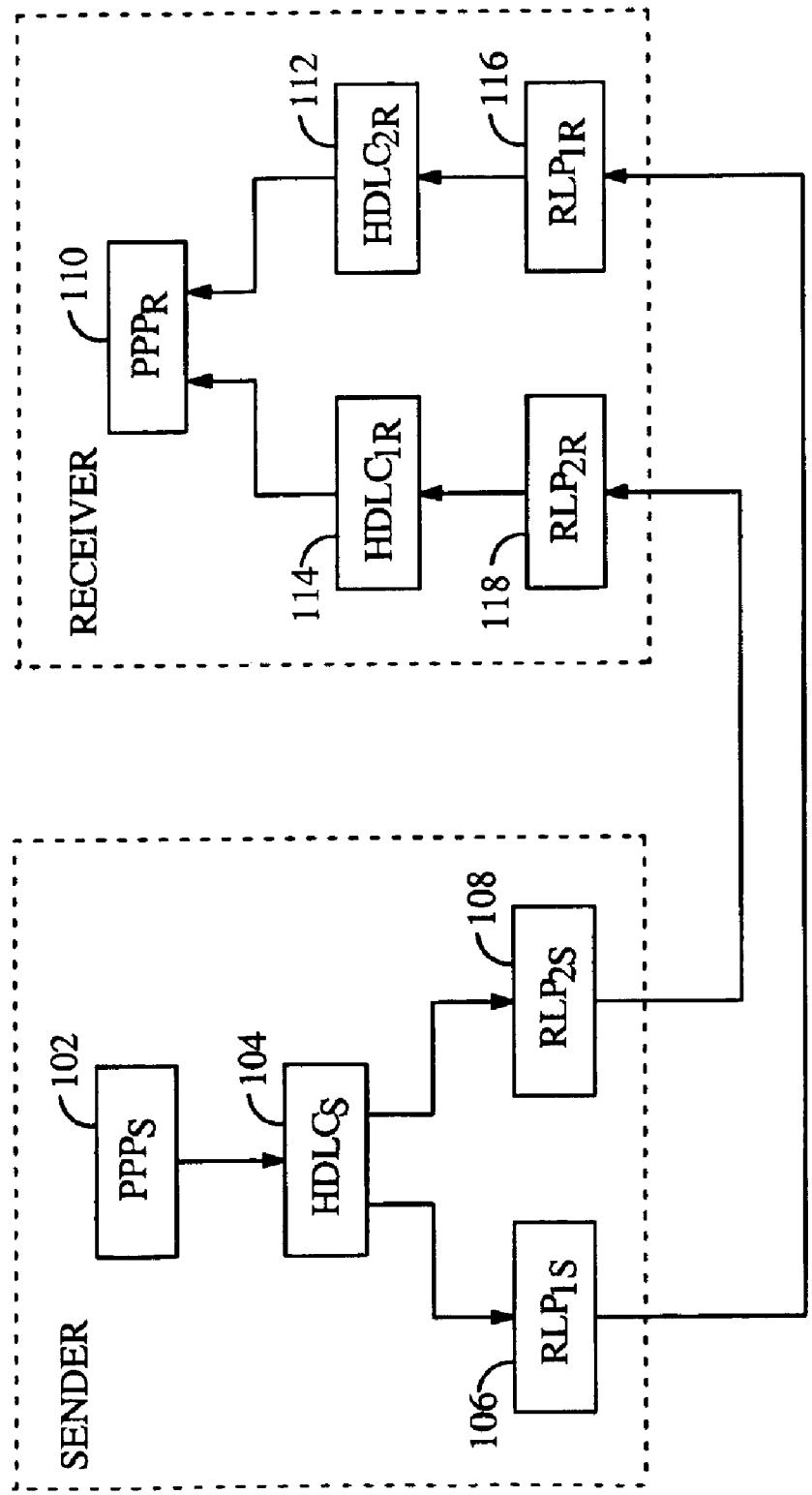
FIG. 1 shows an arrangement of protocol layers according to an exemplary embodiment.

The embodiments discussed below overcome these disadvantages by utilizing a single PPP instance for multiple RLP instances between a MS and the wireless network. FIG. 1 shows an arrangement of protocol layers between a sender and a receiver of packet data using different concurrent grades of service. In an exemplary embodiment, the sender maintains two Radio Link Protocol (RLP) layers (106 and 108), one High-level Data Link Control (HDLC) layer 104 and one Point-to-Point Protocol (PPP) layer 102. Each of the RLP layer instances uses different grades of service (106 and 108). For example, if $RLP_{1S}$ 106 is configured to retransmit frames in response to NAK frames received from the receiver, $RLP_{2S}$ 108 is configured for no retransmissions. In other words, $RLP_{1S}$ 106 provides higher reliability through use of an error control protocol, while $RLP_{2S}$ 108 provides unreliable transport with fixed, minimal transmission delay. The grade of service that characterizes such an $RLP_{1S}$ 106 is referred to herein as "reliable" for short. Similarly, the grade of service that characterizes such an $RLP_{2S}$ 108 is referred to herein as "low latency." Though exemplary embodiments are described herein as using just two grades of service, implementations that use a larger number of different grades of service are also anticipated and are to be considered within the scope of the described embodiments. For example, a sender and receiver could each additionally utilize a third RLP layer that provides an intermediate grade of service having a degree of reliability that lies between "reliable" and "low latency."

In an exemplary embodiment, the receiver also maintains two receive RLP instances (116 and 118) corresponding to the same grades of service as the RLP instances in the sender (106 and 108). For example, if $RLP_{1S}$ is 106 provides reliable grade of service, then $RLP_{1R}$ 116 is configured for reliable grade of service. Thus, when the $RLP_{1R}$ 116 layer detects a break in the sequence numbers of the received RLP frames, then $RLP_{1R}$ 116 responds by sending a NAK frame to prompt retransmission. Upon receiving an RLP NAK frame, $RLP_{1S}$ is 106 retransmits the requested frame from its retransmission buffer. On the other hand, if $RLP_{2S}$ 108 is configured for low latency grade of service, then $RLP_{2R}$ 118 will not send a NAK frame regardless of breaks in frame sequence numbers. Indeed, $RLP_{2S}$ 108 and $RLP_{2R}$ 118 may omit frame sequence numbers entirely from the transmitted RLP frames to make more room for data payload. In addition, $RLP_{2S}$ 108 need not maintain a retransmission buffer of previously sent frames, thus conserving memory in the sender. Also, $RLP_{2R}$ 118 need not maintain a resequencing buffer, thus conserving memory in the receiver.

The $PPP_S$ layer 102 in the sender encapsulates IP packets within PPP frames. In an exemplary embodiment, the $PPP_S$ layer 102 increases packet throughput by performing IP header compression such as the well-known Van-Jacobsen (VJ) header compression. VJ header compression can result in the loss of certain header information that might otherwise be useful in multiplexing PPP packets between the multiple RLP layers (106 and 108). In an exemplary embodiment, the $PPP_S$ layer 102 provides whole PPP packets to the $HDLC_S$ layer 104, and also provides information that can be used to determine which RLP layer to send the framed data through. In an exemplary embodiment, the $PPP_S$ layer 102 provides a grade of service identifier or an RLP instance identifier with each PPP packet provided to the $HDLC_S$ layer 104. The $HDLC_S$ 104 layer adds flag characters between the PPP packets and adds a cyclical redundancy checksum (CRC) to each PPP packet received from the $PPP_S$ layer 102. The $HDLC_S$ layer 104 further performs HDLC escaping to ensure that no flag or HDLC control characters appear within the data of a single frame. The $HDLC_S$ layer 104 typically performs HDLC escaping by replacing each flag or control character with an escape sequence having at least two characters.

The receiver in FIG. 1 is shown with a separate HDLC layer (112 and 114) for each RLP instance (116 and 118). The bytes received in the RLP frames by each RLP instance (116 and 118) are presented to the corresponding HDLC layer instances (112 and 114). Each HDLC layer instance (112 and 114) locates escape sequences in its respective input data stream and converts each escape sequence back to the original data within the transmitted frames. The HDLC layer instances (112 and 114) also perform checks of the CRC's received in the frames to determine whether the frames were received with communication errors. Frames having incorrect CRCs are silently discarded, and frames having correct CRC's are forwarded to the next protocol layer up ($PPP_R$) 110.

Figure 2:
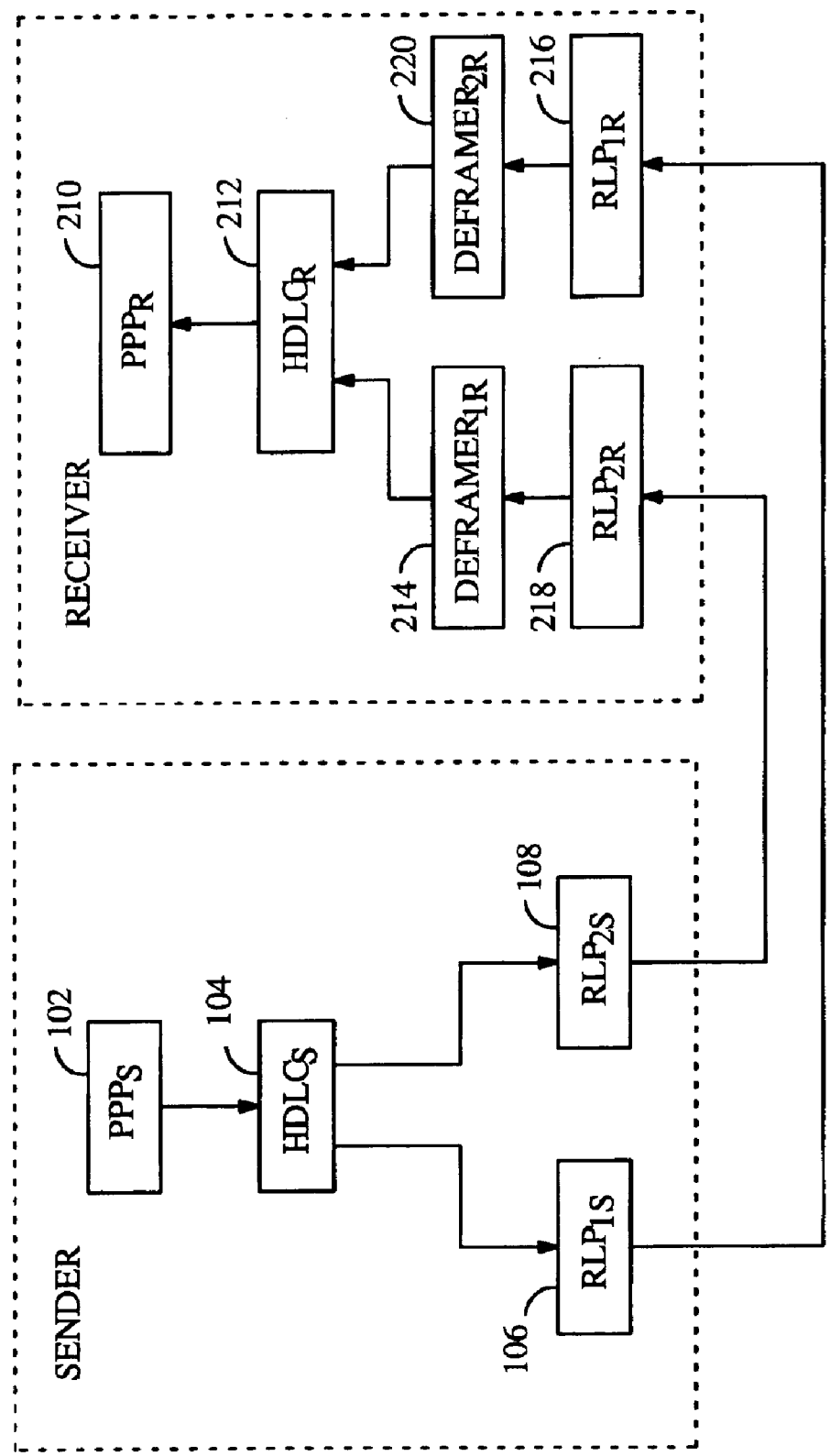
FIG. 2 shows an arrangement of protocol layers according to an alternative embodiment.

FIG. 2 shows an alternate arrangement of protocol layers. The arrangement of protocol layers in the sender in FIG. 2 is identical to that of the sender in FIG. 1. In the receiver, however, a single $HDLC_R$ layer 212 is used instead of one for each RLP instance. Deframer layers (214 and 220) are inserted between the RLP layers (218 and 216) and the $HDLC_R$ layer 212. The purpose of the deframers (214 and 220) is to ensure that only whole HDLC frames are delivered to the $HDLC_R$ layer 212. Delivering only whole HDLC frames makes it unnecessary for the $HDLC_R$ layer 212 to differentiate between, or reassemble, data from multiple HDLC frames. The $HDLC_R$ layer 212 removes escape sequences and checks the CRC for an entire frame. If the CRC is deemed correct, then the $HDLC_R$ layer 212 forwards the complete PPP frame to the $PPP_R$ layer 210. If the CRC is incorrect, the $HDLC_R$ layer 212 silently discards the erroneous frame data.

One benefit of using deframer layers (214 and 220) is that it enables the receiver to support multiple instances of RLP (218 and 216) without any changes to the implementation of the $HDLC_R$ layer 212. The $HDLC_R$ layer 212 need not even be aware that the received bytes have been received through two different RLP connections. This implementation independence is especially important in network implementations where the $HDLC_R$ protocol layer 212 resides in a different physical device than the RLP protocol layers. For example, the $HDLC_R$ layer might exist within a standard packet router, and the RLP layers might exist within a Packet Control Function (PCF) within a Radio Access Network (RAN) of a wireless network. The use of the deframer layers makes it possible to support multiple RLP layers and grades of service without changing the software of the standard packet router.

Figure 3:
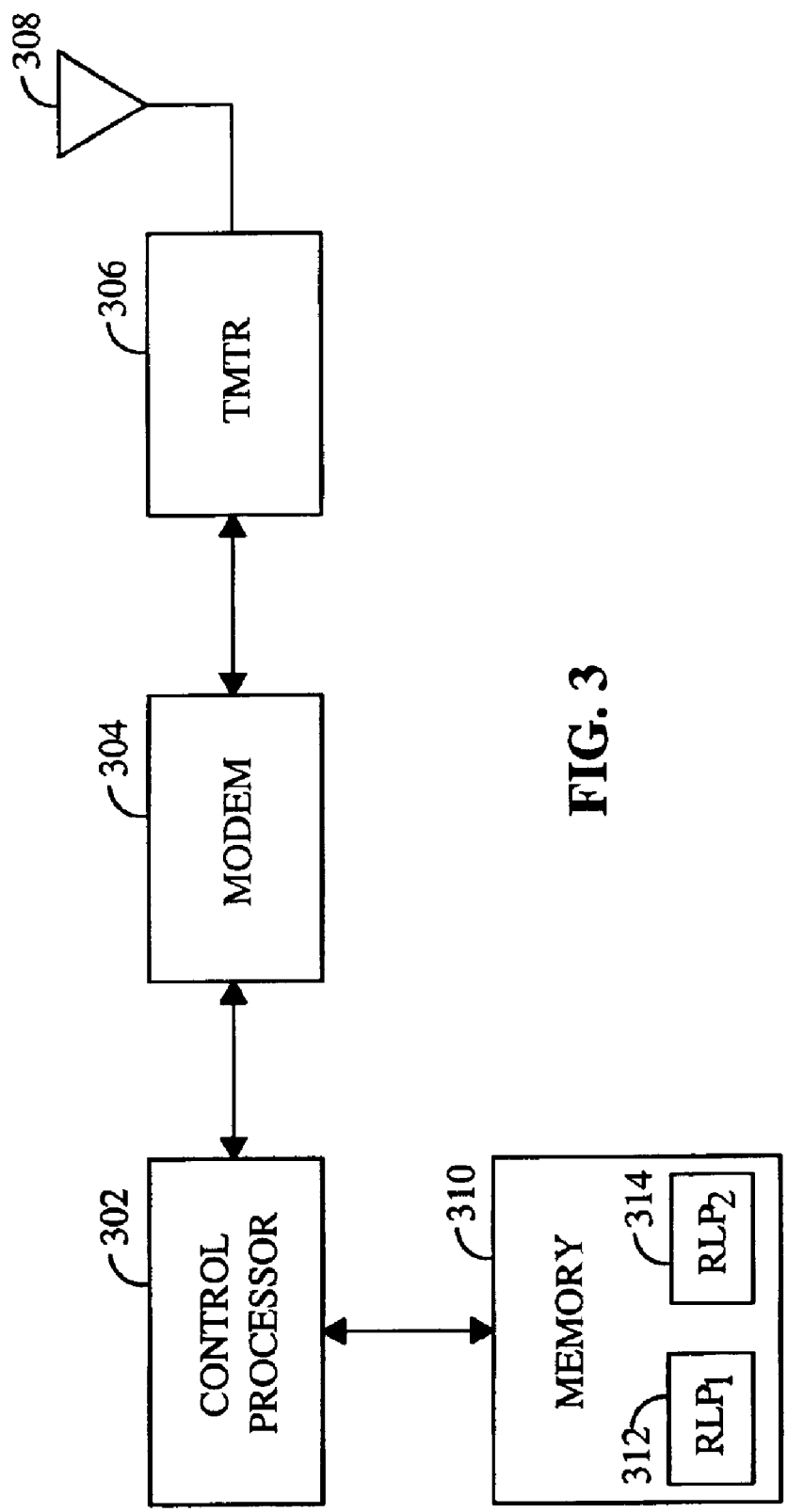
FIG. 3 is a diagram of an exemplary mobile station (MS) apparatus.

FIG. 3 shows an exemplary mobile station (MS) that supports the multiple grades of service as discussed above. A control processor 302 establishes a wireless connection through a wireless modem 304, transmitter 306, and antenna 308 as shown. In an exemplary embodiment, the wireless modem 304 and transmitter 306 operate in accordance with the cdma2000 specification. Alternatively, the wireless modem 304 and transmitter 306 could operate in accordance with some other wireless standard such as IS-95, W-CDMA, or EDGE.

The control processor 302 is connected to a memory 310 having code or instructions directing the control processor 302 to establish and utilize the protocol layers shown in FIGS. 1–2. The memory 310 may include RAM memory, flash memory, ROM memory, EPROM memory, EEPROM memory, registers, hard disk, a removable disk, a CD-ROM, or any other form of storage medium or computer readable media known in the art.

In an exemplary embodiment, the control processor 302 uses some of the memory 310 as memory buffers (312 and 314) necessary for operation of the multiple RLP layers. For example, if the $RLP_1$ buffer 312 corresponds to a reliable RLP connection, it will include a retransmission buffer for RLP data being sent and a resequencing buffer for RLP data being received. If the $RLP_2$ buffer 314 corresponds to a low latency RLP connection, then the $RLP_2$ buffer 314 need not have either a retransmission buffer or a resequencing buffer. Because these two buffers are not needed, the $RLP_2$ buffer 314 occupies a smaller amount of memory than the $RLP_1$ buffer 312. Though depicted as disjoint, the buffers (312 and 314) may also overlap if some data structures are shared between the multiple RLP implementations.

Figure 4:
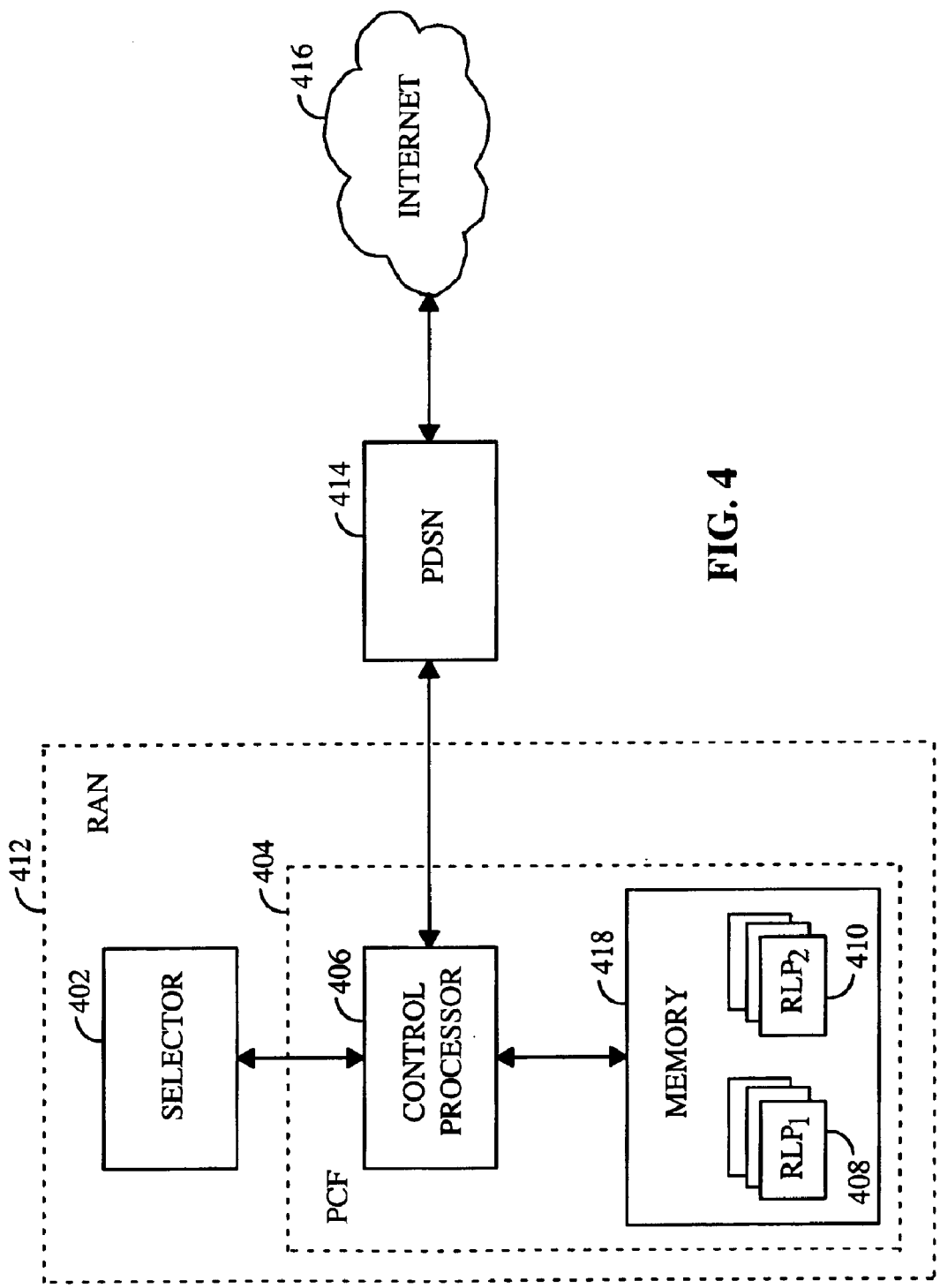
FIG. 4 is a diagram of an exemplary wireless network apparatus.

FIG. 4 shows an exemplary wireless communication network having a connection with a packet network such as the Internet 416. The wireless communication network includes a RAN 412 and a PDSN 414. The RAN 412 further includes a selector 402 that is connected to one or more wireless base stations (not shown). The selector 402 in the RAN 412 is generally a subsystem of a base station controller (BSC), which is not shown. All wireless data sent to or received from th MS is routed through the selector. In addition to the selector 402, the RAN 412 also includes a Packet Control Function (PCF) 404. For packet data service options, the selector sends packet data received from the MS through the PCF 404, which further includes a control processor 406 and memory 418.

The memory 418 contains code or instructions directing the control processor 406 to establish and utilize the protocol layers shown in FIGS. 1–2. The memory 418 may include RAM memory, flash memory, ROM memory, EPROM memory, EEPROM memory, registers, hard disk, a removable disk, a CD-ROM, or any other form of storage medium or computer readable media known in the art.

In an exemplary embodiment, the control processor 406 establishes multiple buffer areas (408 and 410) within the memory 418 for the various RLP connections established with multiple mobile stations. In an exemplary embodiment, one pool of $RLP_1$ buffers 408 includes retransmission and resequencing buffers for use in reliable RLP instances. Another pool of $RLP_2$ buffers 410 is used for low latency RLP instances, and therefore does not include retransmission and resequencing buffers. The control processor 406 may allocate more than one RLP instance to a single MS. For example, one $RLP_1$ buffer and one $RLP_2$ buffer may be allocated to a single MS that is running a combination of delay-sensitive and non-delay-sensitive applications.

The control processor 406 is also connected to a PDSN 414. In an exemplary embodiment, when the MS sends an IP packet to the packet network 416, the control processor 406 receives the RLP frames from the selector 402 and uses the associated RLP buffer (408 or 410) to extract a stream of bytes from the RLP frames. The bytes are then sent from the control processor 406 to the PDSN 414, which extracts complete IP packets (those having correct CRC values) from the byte stream in accordance with the HDLC protocol. The PDSN 414 then forwards the resultant IP packets to the packet network 416. If the PDSN 414 maintains a single HDLC connection for multiple RLP connections to a single MS, then the control processor 406 performs deframing before sending the bytes from the RLP frames to the PDSN 414. The result of deframing is that whole HDLC frames are forwarded by the control processor 406 to the PDSN 414. In other words, the control processor 406 ensures that no data from an HDLC frame received on one RLP link will be intermingled with the data from an HDLC frame received on another RLP link. Deframing allows better resource usage in addition to enabling the use of existing PDSNs that cannot allocate more than a single PPP/HDLC to an IP address.

When the packet network 416 sends a packet to the MS, the packets are first received at the PDSN 414. In an exemplary embodiment, the PDSN 414 encapsulates the IP datagrams addressed to the MS into PPP packets and uses HDLC framing to convert the resulting PPP packets into a stream of bytes. In an exemplary embodiment, the PDSN 414 assigns a single HDLC instance to a single MS, and uses that HDLC instance to perform HDLC framing of any IP packet addressed to that MS. In an alternate embodiment, the PDSN 414 may have multiple HDLC instances assigned to a single MS, such that each HDLC instance corresponds to a single RLP connection within the MS.

The connections between the PDSN 414 and the network 416, between the PDSN 414 and the control processor 406, and between the control processor 406 and the selector 402, may use any of a variety of interfaces including ethernet, T1, ATM, or other fiber, wired or wireless interface. In exemplary embodiment, the connection between the control processor 406 and the memory 418 will generally be a direct hardware connection such as a memory bus, but may also be one of the other types of connection discussed above.

Figure 5:
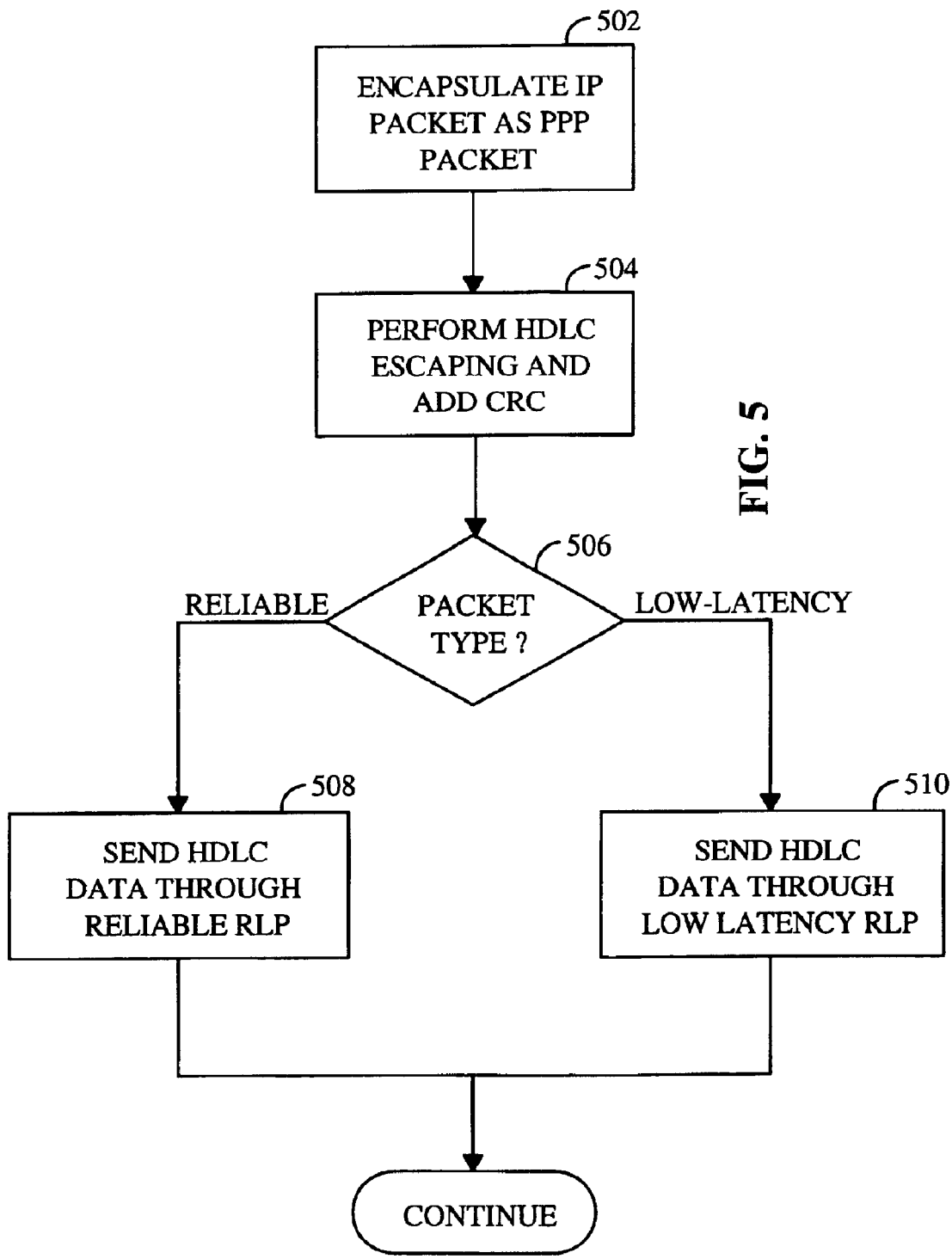
FIG. 5 is a flowchart of an exemplary method of sending packets through multiple RLP connections having different grades of service.

FIG. 5 is a flowchart of an exemplary method of sending packets through multiple RLP connections having different grades of service. In an exemplary embodiment, a control processor of the sending apparatus (302 of FIG. 3 or 406 of FIG. 4) utilizes the method characterized by FIG. 5. At step 502, the sender encapsulates the IP packet to be sent into a PPP packet. In an exemplary embodiment, IP header compression such as Van-Jacobsen (VJ) header compression is also performed at step 502. At step 504, the sender then converts the PPP packet into a byte stream according to the HDLC protocol. Specifically, each PPP packet is converted into an HDLC frame. One or more flag characters are inserted between HDLC frames in the byte stream, and flag and control characters that appear within each frame are replaced with escape sequences. Probably the most common examples of HDLC escaping are replacing the flag sequence octet 0x7e (hexadecimal) with the two octets 0x7d 0x5e (hexadecimal) and replacing octet 0x7d (hexadecimal) with the two octets 0x7d 0x5d (hexadecimal). Also at step 504, a CRC is computed for each frame and inserted at the end of the frame (before the flag character that signals the end of the frame). At step 506, the sender determines which of a set of available grades of service should be used to send the data for the frame based on the type of the packet. IP packets being sent using non-delay-sensitive applications such as FTP or TCP are sent at step 508 using reliable RLP (with retransmission and resequencing). Also, any packets that are not IP packets, but still non-delay-sensitive (such as IPCP or LCP packets) are sent at step 508 using reliable RLP. Delay-sensitive types of packets, such as Real-Time Protocol (RTP) packets used for video conferencing services, are sent at step 510 using low latency RLP. As discussed above, low latency RLP does not send or request retransmissions of RLP frames lost to communication errors. Though two grades of service are shown in the exemplary embodiment of FIG. 5., one skilled the art will recognize other systems may utilize more than two different grades of service without departing from the scope of the described embodiments. For example, at step 506, the sender may elect to send some types of packets through an RLP connection having an intermediate level of reliability.

Figure 6:
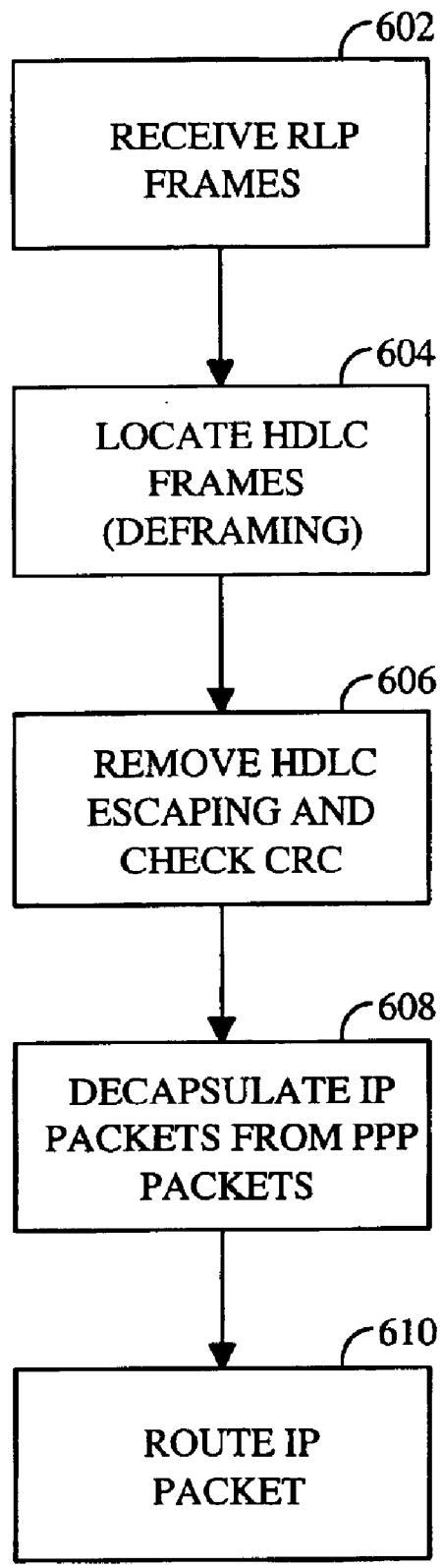
FIG. 6 is a flowchart of an exemplary method of receiving packets through multiple RLP connections having different grades of service.

FIG. 6 is a flowchart of an exemplary method of receiving packets through multiple RLP connections having different grades of service. In an exemplary embodiment, a control processor of the receiving apparatus (302 of FIG. 3 or 406 of FIG. 4) utilizes the method characterized by FIG. 6. At step 602, the receiver processes received RLP frames received through one or more RLP connections. In an exemplary embodiment as described above, the RLP frames are received through two types of RLP connections, low latency and reliable.

As described in the aforementioned IS-707, RLP frames received through a reliable RLP connection have sequence numbers that the receiver uses to resequence the frames and request retransmission of lost frames. For example, if an RLP frame having the sequence number "7" is lost to communication errors, the receiver sends a NAK frame to request retransmission of that frame. When the retransmitted frame is received, the data carried in that frame is used to complete the stream of data bytes before providing any subsequent data bytes to the HDLC layer. As a result, the stream of data bytes extracted from the RLP frames of a reliable RLP connection will generally not have gaps compared to what was transmitted by the sender. The cost of preventing gaps in the data is variable latency.

In contrast, when an RLP frame is lost to communication error on a low latency RLP link, no retransmission is requested or sent. Any data bytes carried in such a lost RLP frame is omitted from the stream of data bytes presented to the receiver's HDLC layer. In other words, the loss of an RLP frame on a low latency RLP link invariably causes a gap in the receiver's stream of data bytes compared to what was transmitted by the sender. However, low latency RLP protocol has latency that is both fixed and small, making it highly suitable for sending delay-sensitive types of packets, such as RTP packets.

In an exemplary embodiment described in FIG. 2, the receiver uses deframers (214 and 220 in FIG. 2) received through multiple RLP connections (218 and 216 in FIG. 2) in order to provide whole HDLC frames of data to a single HDLC protocol layer (212 in FIG. 2). In FIG. 6, this deframing is performed at step 604. At step 606, the HDLC protocol layer (212 in FIG. 2) removes HDLC escape sequences that were inserted by the sender and checks the CRC of each HDLC frame. At step 606, any HDLC frame bearing an incorrect CRC is silently discarded by the receiver. The resulting PPP frames are then provided by the HDLC protocol layer to the PPP layer. At step 608, the PPP layer decapsulates the received packets, removing the PPP header and any other changes made by the sender. Also at step 608, if the sender compressed the IP header of the received packet (for example, using VJ header compression), then the IP header is expanded to its original size and contents. The decapsulated packets are then routed at step 610. Though the embodiments described above discuss primarily encapsulating IP packets, PPP and HDLC can also be used to send packets for other protocols such as IPX or LCP.

In an exemplary embodiment using deframers (214 and 220 in FIG. 2), steps 602 and 604 are performed by the control processor (406 of FIG. 4) within the RAN (412 of FIG. 4), and steps 606, 608, and 610 are performed by the PDSN (414 of FIG. 4). In alternate embodiment such as that shown in FIG. 1, the PDSN (414 of FIG. 4) allocates multiple HDLC layers (112 and 114 of FIG. 1) to a single MS. In this embodiment, there is no deframing performed by the receiver, and step 604 is omitted. At step 602, each RLP layer (116 and 118 of FIG. 1) provides data extracted from received RLP frames directly to its corresponding HDLC layer (112 and 114 of FIG. 1, respectively).

Thus, described herein is a method and apparatus for providing multiple quality of service levels in a wireless packet data services connection. Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. One skilled in the art will also recognize that the PDSN in the above-described embodiments could also be replaced with an Interworking Function (IWF) without departing from the scope of the described embodiments.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium or computer readable media known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a mobile station. In the alternative, the processor and the storage medium may reside as discrete components in a mobile station.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A computer readable media embodying instructions executable by a processor to perform a method for providing packet data services, the method comprising:

establishing a single Point-to-Point Protocol (PPP) layer for communication between a mobile station and a wireless network;

sending and receiving data through said single PPP layer using a first Radio Link Protocol (RLP) layer characterized by a first grade of service;

sending and receiving data through said single PPP layer using a second RLP layer characterized by a second grade of service, wherein the first grade of service is different from the second grade of service;

establishing a single High-level Data Link Control (HDLC) layer between said PPP layer and said first and second RLP layers; and establishing a deframer layer between said HDLC layer and said first RLP layer, said deframer layer configured to provide whole HDLC frames to said HDLC layer.

2. The computer readable media of claim 1, the method further comprising:

establishing a first buffer having a first buffer size based on the first grade of service; and establishing a second buffer having a second buffer size based on the second grade of service.

3. The computer readable media of claim 2, wherein the first buffer includes retransmission and resequencing buffers, and the second buffer does not include retransmission and resequencing buffers.

4. A computer readable media embodying instructions executable by a processor to perform a method for providing packet data services, the method comprising:

establishing a single Point-to-Point Protocol (PPP) layer for communication between a mobile station and a wireless network;

sending and receiving data through said single PPP layer using a first Radio Link Protocol (RLP) layer characterized by a first grade of service;

sending and receiving data through said single PPP layer using a second RLP layer characterized by a second grade of service, wherein the first grade of service is different from the second grade of service;

establishing a first High-level Data Link Control (HDLC) layer between said PPP layer and said first layer; and establishing a second High-level Data Link Control (HDLC) layer between said PPP layer and said second RLP layer.

5. A mobile station apparatus, comprising a processor and a memory, wherein the memory embodies instructions executable by the processor to perform a method for providing packet data services, the method comprising:
- establishing a single Point-to-Point Protocol (PPP) layer for the mobile station;
- sending and receiving data through said single PPP layer using at least two Radio Link Protocol (RLP) layers characterized by at least two different grades of service;
- establishing a single High-level Data Link Control (HDLC) layer between said PPP layer and said at least two layers; and
- establishing a deframer layer between said HDLC layer and one of said at least two RLP layers, said deframer layer configured to provide whole HDLC frames to said HDLC layer.

6. The mobile station apparatus of claim 5, further comprising a wireless modem for modulating RLP frames generated by the first and second RLP layers.

7. The mobile station apparatus of claim 5, further comprising a CDMA wireless modem for modulating RLP frames generated by the first and second RLP layers.

8. The mobile station apparatus of claim 5, wherein the different grades of service include a reliable grade of service and a low latency grade of service.

9. The mobile station apparatus of claim 5, wherein said method further comprises establishing a buffer for each of said at least two RLP layers, and wherein the size of each buffer is base on the grade of service of the corresponding RLP layer.

10. The mobile station apparatus of claim 9, wherein each buffer includes retransmission and resequencing buffers only if the corresponding RLP layer is reliable.

11. A packet control function (PCF) apparatus, comprising a processor and a memory, wherein the memory embodies instructions executable by the processor to perform a method comprising:
- establishing a first Radio Link Protocol (RLP) layer characterized by a first grade of service;
- establishing a second RLP layer characterized by a second grade of service different from the first grade of service;
- receiving data from a mobile station through the first RLP layer;
- receiving data from the mobile station through the second RLP layer;
- deframing data receive through the first RLP layer to identify a first High-level Data Link Control (HDLC) frame;
- deframing data received through the second RLP layer to identify a second HDLC frame;
- providing the first HDLC frame to a Packet Data Serving Node (PDSN); and
- providing the second HDLC frame to the PDSN.

12. A packet control function (PCF) apparatus, comprising a processor and a memory, wherein the memory embodies instructions executable by the processor to perform a method comprising:
- establishing a first Radio Link Protocol (RLP) layer characterized by a first grade of service;
- establishing a second RLP layer characterized by a second grade of service different from the first grade of service;
- receiving data through the first RLP layer;
- receiving data through the second RLP layer;
- providing data received through the first RLP layer to a first High-level Data Link Control (HDLC) layer in a Packet Data Serving Node (PDSN); and
- providing data received through the second RLP layer to a second HDLC layer in the PDSN.

13. A wireless network apparatus comprising:
- a Packet Control Function (PCF) for establishing a first Radio Link Protocol (RLP) layer characterized by a first grade of service, establishing a second RLP layer characterized by a second grade of service different from the first grade of service, receiving data through the firs RLP layer, receiving data through the second RLP layer, providing data received through the first RLP layer to a first High-level Data Link Control (HDLC) layer in a Packet Data Serving Node (PDSN), and providing data received through the second layer to a second HDLC layer in the PDSN.

14. The wireless network apparatus of claim 13 further comprising the Packet Data Serving Node (PDSN).

15. A wireless network apparatus comprising:
- a Packet Data Serving Node (PDSN) for extracting IP packets from data received through a single High-level data Link Control (HDLC) layer associated with a single Point-to-Point Protocol (PPP) connection to a mobile station; and
- a Packet Control Function (PCF) for establishing a first Radio Link Protocol (RLP) layer characterized by a first grade of service, establishing a second RLP layer characterized by a second grade of service different from the first grade of service, deframing data received through the first RLP layer to identify a first HDLC frame, deframing data received through the second RLP layer to identify a second HDLC frame, providing the first HDLC frame to the single HDLC layer, and after providing the first HDLC frame to the single HDLC layer, providing the second HDLC frame to the single HDLC layer.

16. A method for providing packet data services, comprising:
- establishing a single Point-to-Point Protocol (PPP) layer for communication between a mobile station and a wireless network;
- sending and receiving data through said single PPP layer using at least two Radio Link Protocol (RLP) layers characterized by at least two different grades of service;
- establishing a single High-level Data Link Control (HDLC) layer between said PPP layer and said at least two RLP layers; and
- establishing a deframer layer between said HDLC layer and said first RLP layer, said deframer layer configured to provide whole HDLC frames to said HDLC layer.

17. The method of claim 16, the method further comprising establishing a buffer for each of said at least two RLP layers, wherein the size of each buffer is based on the grade of service of the corresponding RLP layer.

18. A method for providing packet data services, comprising:
- establishing a single Point-to-Point Protocol (PPP) layer for communication between a mobile station and a wireless network;
- sending and receiving data through said single PPP layer using a first Radio Link Protocol (RLP) layer characterized by a first grade of service;
- sending and receiving data through said single PPP layer using a second RLP layer characterized by a second grade of service, wherein the first grade of service is different from the second grade of service;

establishing a first High-level Data Link Control (HDLC) layer between said PPP layer and said first RLP layer; and establishing a second High-level Data Link Control (HDLC) layer between said PPP layer and said second RLP layer.

19. A mobile station apparatus, comprising a processor and a memory, wherein the memory embodies instructions executable by the processor to perform a method for providing packet data services, the method comprising:

establishing a single Point-to-Point Protocol (PPP) layer for communication between the mobile station and a wireless network;

using the single PPP layer to encapsulate an IP packet associated with a delay-sensitive application to generate a first PPP packet;

using the single PPP layer to encapsulate an IP packet associated with a non-delay-sensitive application to generate a second PPP packet;

sending the first PPP packet through a low latency Radio Link Protocol (RLP) layer to the wireless network;

sending the second PPP packet through a reliable RLP layer to the wireless network;

establishing a single High-level Data link Control (HDLC) layer between the single PPP layer and the low latency and reliable RLP layers; and establishing a deframer layer between said HDLC layer and one of the low latency and reliable RLP layers, the deframer layer configured to provide whole HDLC frames to said HDLC layer.

20. The mobile station apparatus of claim 19, the method further comprising:

converting the first PPP packet into a first High-level Data Link Control (HDLC) frame using the HDLC layer prior to sending the first PPP packet; and converting the second PPP packet into a second HDLC frame using the HDLC layer prior to sending the second PPP packet.

21. A packet control function (PCF) apparatus, comprising a processor and a memory, wherein the memory embodies instructions executable by the processor to perform a method for providing packet data services, the method comprising:

receiving a first set of data through a low latency Radio link Protocol (RLP) layer;

receiving a second set of data station through a reliable RLP layer;

deframing the data received through the low latency RLP layer to identify a first High-level Data Link Control (HDLC) frame;

deframing the data received through the reliable RLP layer to identify a second HDLC frame;

providing the first HDLC frame to a Packet Data Serving Node (PDSN); and providing the second HDLC frame to the PDSN.

22. The packet control function (PCF) apparatus of claim 21, further comprising:

prior to providing the first set of data to the PPP layer, using one or more High-level Data Link Control (HDLC) flag characters within the first set of data to identify at least one complete HDLC frame; and providing the at least one complete HDLC frame to the PDSN through the PPP connection.

23. The packet control function (PCF) apparatus of claim 21, further comprising:

prior to providing the first set of data to the PPP layer, using one or more High-level Data Link Control (HDLC) flag characters within the second set of data to identify at least one complete HDLC frame; and providing the at least one complete HDLC frame to the PDSN through the PPP connection.

24. The packet control function (PCF) apparatus of claim 21, further comprising:

providing the first set of data to a Point-to-Point (PPP) layer through a first High-level Data Link Control (HDLC) connection with the PDSN; and providing the second data to the PPP layer through a second HDLC connection with the PDSN.

25. An apparatus comprising:

a Packet Control Function (PCF) configured to establish a first Radio Link Protocol (RLP) layer characterized by a first grade of service, to establish a second RLP layer characterized by a second grade of service different from the first grade of service, to deframe data received through the first RLP layer to identify a first HDLC frame, to deframe data received through the second RLP layer to identify a second HDLC frame, to provide the first HDLC frame to a single High-level Data Link Control (HDLC) layer associated with a single Point-to-Point Protocol (PPP) connection to a mobile station, and after providing the first HDLC frame to the single HDLC layer, to provide the second HDLC frame to the single HDLC layer.

26. The apparatus of claim 25 further comprising a Packet Data Serving Node (PDSN), configured to extract IP packets from data received through the single HDLC layer.

* * * * *

UNITED STATES PATENT AND TRADEMARK OFFICE
CERTIFICATE OF CORRECTION

PATENT NO. : 7,096,261 B2
APPLICATION NO. : 09/823475
DATED : August 22, 2006
INVENTOR(S) : Nischal Abrol et al.

It is certified that error appears in the above-identified patent and that said Letters Patent is hereby corrected as shown below:

Title Page, item (75) Inventors: should read:
Nischal Abrol, San Diego, CA
Marcello Lioy, San Diego, CA
Raymond Tah-Sheng Hsu, San Diego, CA Signed and Sealed this Eighteenth Day of March, 2008

JON W. DUDAS
*Director of the United States Patent and Trademark Office*